United States Patent
Smith et al.

(10) Patent No.: US 6,813,943 B2
(45) Date of Patent: Nov. 9, 2004

(54) METHOD AND APPARATUS FOR CONDITIONING A GAS FLOW TO IMPROVE A RATE OF PRESSURE CHANGE MEASUREMENT

(75) Inventors: John A. Smith, Andover, MA (US); Ali Shajii, Canton, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/391,829

(22) Filed: Mar. 19, 2003

(65) Prior Publication Data

US 2004/0182148 A1 Sep. 23, 2004

(51) Int. Cl.[7] .............................................. G01F 15/04
(52) U.S. Cl. ....................................................... 73/199
(58) Field of Search ...................... 73/199, 223, 861.52; 702/45, 189, 190, 191; 137/487.5

(56) References Cited

U.S. PATENT DOCUMENTS

| | | | | |
|---|---|---|---|---|
| 3,815,627 A | * | 6/1974 | Farrell et al. ................ | 137/486 |
| 5,220,940 A | * | 6/1993 | Palmer .................... | 137/487.5 |
| 6,061,603 A | | 5/2000 | Papadopoulos et al. | |
| 6,151,625 A | | 11/2000 | Swales et al. | |
| 6,321,272 B1 | | 11/2001 | Swales | |
| 6,422,256 B1 | * | 7/2002 | Balazy et al. ................. | 137/12 |
| 6,595,231 B1 | * | 7/2003 | Best ............................. | 137/14 |
| 6,640,140 B1 | | 10/2003 | Lindner et al. | |

\* cited by examiner

Primary Examiner—Edward Lefkowitz
Assistant Examiner—Corey D. Mack
(74) Attorney, Agent, or Firm—McDermott, Will & Emery LLP

(57) ABSTRACT

An apparatus for conditioning a gas flow to improve a measurement of rate of pressure change associated with the gas flow includes a measurement chamber having an interior portion characterized by an internal volume, and an inlet port for receiving the gas flow. The apparatus includes a pressure sensor and a signal processor. The signal processor receives and samples the pressure signal from the sensor, and calculates a time derivative of the pressure signal. The apparatus also includes an inlet damper disposed at the inlet port, so that the gas flow passes through the inlet damper prior to passing into the measurement chamber. The inlet damper modifies the gas flow according to a damper transfer function. The chamber volume and the damper transfer function are selected so as to the frequencies associated with variations of the pressure in the measurement chamber to a predetermined fraction of the sampling frequency.

20 Claims, 5 Drawing Sheets

METHOD AND APPARATUS FOR CONDITIONING A GAS FLOW TO IMPROVE A RATE OF PRESSURE CHANGE MEASUREMENT

CROSS-REFERENCE TO RELATED APPLICATIONS

This application is related to the following U.S. application, of common assignee, the contents of which are incorporated herein in their entirety by reference:

U.S. patent application Ser. No. 10/178,721, entitled "Apparatus And Method For Pressure Fluctuation Insensitive Mass Flow Control.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to devices for controlling mass flow, and more particularly, to methods and devices for conditioning the flow to improve the sensitivity and accuracy of such a device.

Consider the system 10 shown in block diagram form in FIG. 1, which includes an inlet reservoir 12 coupled to a measurement chamber 14. The inlet reservoir 12 is characterized by an inlet pressure $P_i(t)$. The measurement chamber 14 is characterized by an inlet port 16 where the inlet reservoir 12 is coupled to the measurement chamber 14, an internal volume V, and an internal pressure P(t). An inlet flow Q(t) flows from the inlet reservoir 12 to the measurement chamber 14 through the inlet port 16. The rate of change of the pressure P(t) within the measurement chamber 14 as a function of time may be given by:

$$\frac{dP(t)}{dt} = \dot{P}(t) = \frac{P_{STP}}{V}Q(t) \qquad (1)$$

where $P_{STP}$ is the chamber pressure at standard temperature and pressure. Equation (1) may be rewritten to solve for the inlet flow, i.e., $$Q(t) = \frac{\dot{P}(t)V}{P_{STP}} \qquad (2)$$

Thus, the inlet flow may be calculated as a function of the time rate of change of the chamber pressure $\dot{P}(t)$ and the volume of the chamber V. The volume of the chamber V may be easily measured, and the time rate of change of the chamber pressure $\dot{P}(t)$ may be acquired by employing a pressure sensor 18 combined with a digital differentiation scheme 20 (see, for example, S. K. Mitra and J. F. Kaiser, "Handbook for Digital Signal Processing," John Wilcy & Sons, 1993, Chapter 13). However, a practical digital differentiator 20 samples the pressure data at a maximum sampling frequency, filters the sampled data, and performs the time derivative of the sampled, filtered data. Such a digital differentiator 20 only produces accurate results for pressure variations having frequencies less than a fraction of the maximum sampling frequency, as shown in the graph of FIG. 2. This graph plots the normalized differentiator output against the normalized frequency of the pressure variation (normalized to the sampling frequency) for an ideal differentiator 30 and the practical differentiator 32 discussed above. The practical digital differentiator 32 tracks the ideal differentiator 30 for frequencies up to approximately 0.4 of the sampling frequency, and radically departs from the ideal for higher frequencies of pressure variations. Thus, rapid pressure changes that are greater than 40 percent of the sampling frequency cannot be accurately measured by the configuration of FIG. 1. This point of departure from the ideal differentiator is referred to herein as the "differentiator cutoff frequency."

It is an object of the present invention to substantially overcome the above-identified disadvantages and drawbacks of the prior art.

SUMMARY OF THE INVENTION

The foregoing and other objects are achieved by the invention which in one aspect comprises an apparatus for conditioning a gas flow to improve a measurement of rate of pressure change associated with the gas flow. The apparatus includes a measurement chamber having an interior portion characterized by an internal volume, and an inlet port for receiving the gas flow. The apparatus also includes a pressure sensor for sensing a pressure within the interior portion of measurement chamber and for producing a pressure signal corresponding the pressure within the measurement chamber. The apparatus also includes a signal processor for receiving, sampling the pressure signal at a sampling frequency and filtering the pressure signal so as to produce a sampled pressure signal. The signal processor further calculates a time derivative of the sampled pressure signal. The apparatus also includes an inlet damper disposed at the inlet port, constructed and arranged such that the gas flow passes, at least partially, through the inlet damper prior to passing through the inlet port and into the measurement chamber. The inlet damper modifies one or more characteristics of the gas flow as a function of a pressure drop across the inlet damper, according to a damper transfer function. The internal volume and the damper transfer function are selected so as to the frequencies associated with variations of the pressure in the measurement chamber to a predetermined fraction of the sampling frequency.

In another embodiment, the pressure sensor is disposed within the interior portion of the measurement chamber.

In another embodiment, the pressure sensor is disposed at the inlet port, and produces a pressure signal corresponding to an inlet flow pressure.

In another embodiment, the damper transfer function describes a linear relationship between (i) the pressure drop across the inlet damper and (ii) the gas flow through the inlet damper.

In another embodiment, the damper transfer function describes a non-linear relationship between (i) the pressure drop across the inlet damper and (ii) the gas flow through the inlet damper.

In another embodiment, the predetermined fraction of the sampling frequency corresponds to a performance limit associated with the signal processor for calculating a time derivative of the sampled pressure signal In another embodiment, the predetermined fraction of the sampling frequency is about 0.4.

In another embodiment, the apparatus further includes a flow sensor for measuring the gas flow through the inlet port and for producing a flow signal corresponding to the gas flow through the inlet port. The apparatus also includes an outlet port on the measurement chamber for passing an outlet gas flow, and a valve disposed at the outlet port for controlling the outlet gas flow. The signal processor (i) combines the flow signal with the time derivative of the sampled pressure signal so as to produce an estimate of the outlet gas flow, and (ii) controls the valve as a function of the estimate, so as to produce a substantially constant outlet gas flow.

In another embodiment, the damper is disposed before the flow sensor.

In another embodiment, the damper is disposed after the flow sensor, and before the pressure sensor.

In another aspect, the invention comprises a method of conditioning a gas flow to improve a measurement of rate of pressure change associated with the gas flow. The method includes providing a measurement chamber having an interior portion characterized by an internal volume, and an inlet port for receiving the gas flow. The method also includes sensing a pressure within the interior portion of measurement chamber and producing a pressure signal corresponding the pressure within the measurement chamber. The method further includes sampling the pressure signal at a sampling frequency and filtering the pressure signal so as to produce a sampled pressure signal, and calculating a time derivative of the sampled pressure signal. The method further includes damping the gas flow through the inlet port via an inlet damper disposed at the inlet port, so as to modify one or more characteristics of the gas flow as a function of a pressure drop across the inlet damper, according to a damper transfer function. The method also includes selecting the internal volume and the damper transfer function so as to limit a frequency associated with variations of the pressure within the measurement chamber to a predetermined fraction of the sampling frequency.

Another embodiment further includes disposing the pressure sensor within the interior portion of the measurement chamber.

Another embodiment further includes disposing the pressure sensor at the inlet port, such that the pressure sensor produces a pressure signal corresponding to an inlet flow pressure.

Another embodiment further includes providing a damper transfer function that describes a linear relationship between (i) the pressure drop across the inlet damper and (ii) the gas flow through the inlet damper.

Another embodiment further includes providing a damper transfer function that describes a non-linear relationship between (i) the pressure drop across the inlet damper and (ii) the gas flow through the inlet damper.

Another embodiment further includes selecting the internal volume and the damper transfer function so as to limit a frequency associated with variations of the pressure within the measurement chamber to a predetermined fraction of the sampling frequency corresponding to a performance limit associated with the signal processor for calculating a time derivative of the sampled pressure signal.

Another embodiment further includes selecting the internal volume and the damper transfer function so as to limit a frequency associated with variations of the pressure within the measurement chamber to a predetermined fraction of the sampling frequency of about 0.4 of the sampling frequency.

Another embodiment further includes measuring the gas flow through the inlet port and producing a flow signal corresponding to the gas flow through the inlet port. This embodiment also includes providing an outlet port on the measurement chamber for passing an outlet gas flow, and combining the flow signal with the time derivative of the sampled pressure signal so as to produce an estimate of the outlet gas flow. This embodiment also includes controlling the outlet gas flow at the outlet port as a function of the estimate, so as to produce a substantially constant outlet gas flow.

Another embodiment further includes disposing the damper before the flow sensor.

Another embodiment further includes disposing the damper after the flow sensor, and before the pressure sensor.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
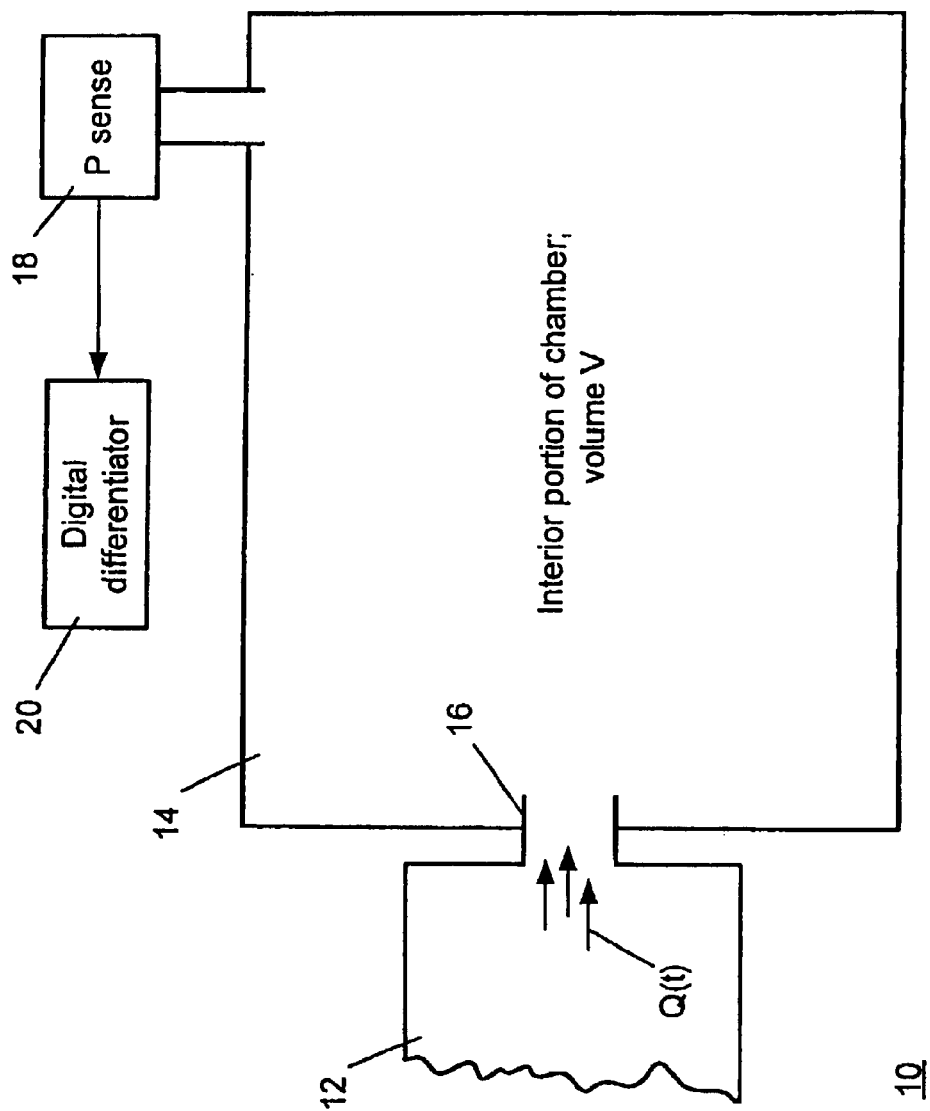
FIG. 1 shows a block diagram view of a prior art pressure measurement system.
Figure 2:
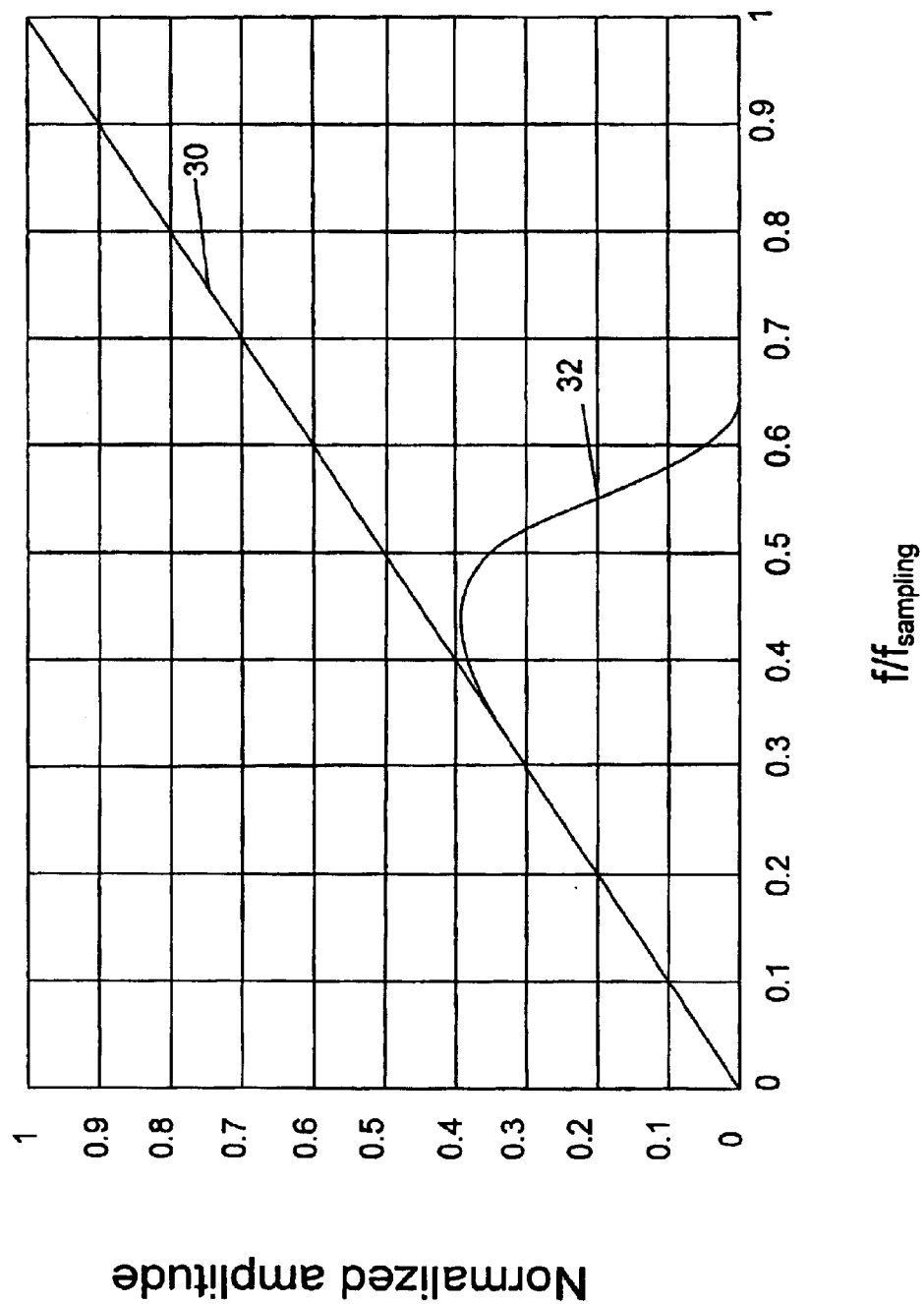
FIG. 2 shows the roll-off in performance of a prior art digital differentiator at higher frequencies.
Figure 3:
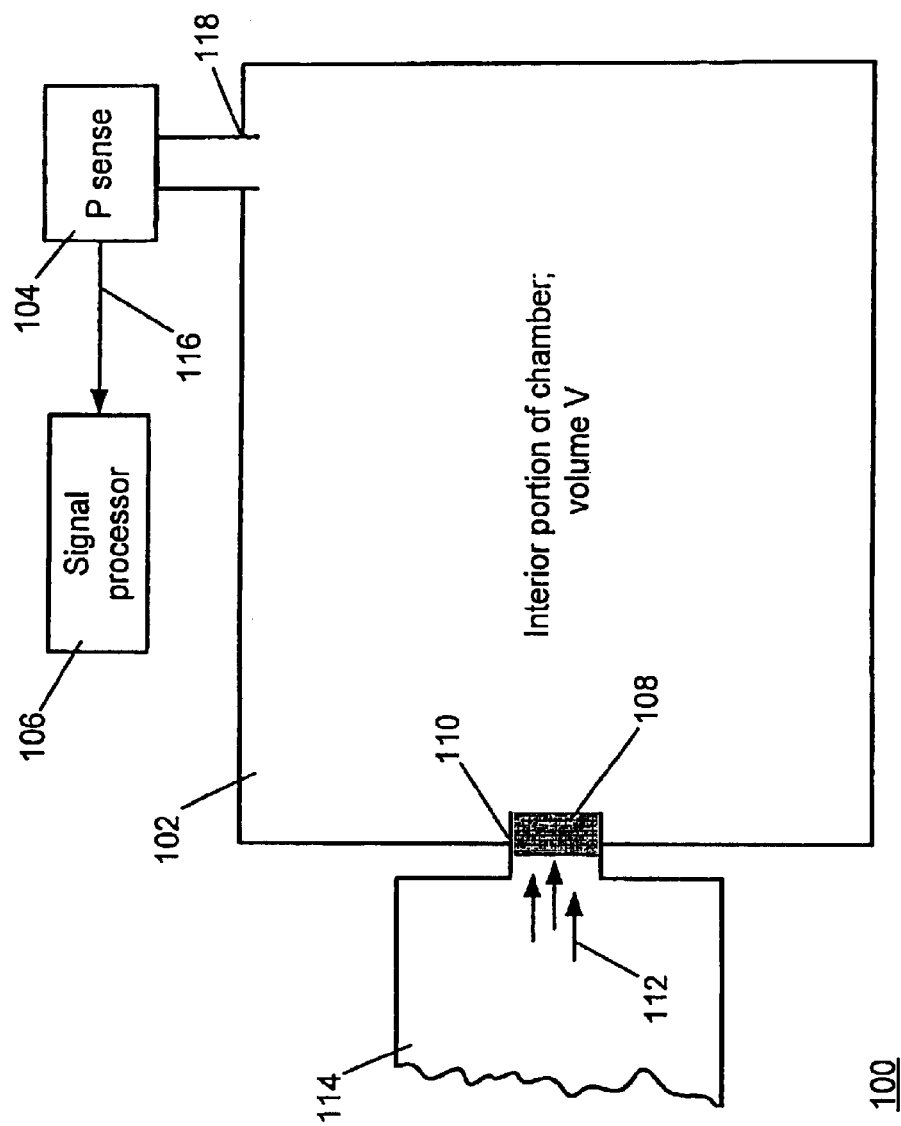
FIG. 3 shows a block diagram view of one preferred embodiment of an apparatus for conditioning a gas flow to improve the measurement of a rate of pressure change associated with the gas flow.

FIG. 3 shows a block diagram view of one preferred embodiment of an apparatus 100 for conditioning a gas flow to improve the measurement of a rate of pressure change associated with the gas flow. The apparatus 100 includes a measurement chamber 102, a pressure sensor 104, a signal processor 106, and an inlet damper 108. The measurement chamber 102 includes an interior portion, the size of which is defined by an internal volume V. The measurement chamber 102 also includes an inlet port 110 for receiving a gas flow 112 from a reservoir 114.

The pressure sensor 104 senses the pressure within the interior portion of the measurement chamber 102, and produces a pressure signal 116 corresponding to the pressure within the interior portion of the measurement chamber 102. In one embodiment, the pressure sensor 104 is located outside of the measurement chamber 102 (either attached to the exterior of the measurement chamber as shown in FIG. 3, or physically separate from the measurement chamber), and accesses the interior portion via an access port 118. In other embodiments, the entire pressure sensor is disposed within the interior portion of the measurement chamber 102, and the associated pressure signal 116 communicated outside of the chamber 102 via wire or some other communications technique known in the art. In other embodiments, the pressure sensor 104 may be located at the inlet port 110, either just inside or just outside the chamber 102, so that the pressure sensor 104 provides a pressure signal corresponding to the inlet pressure.

The signal processor 106 implements an optimum digital differentiator. The signal processor 106 receives the pressure signal, then samples it at a predetermined sampling rate. The sampling rate used in a particular embodiment depends on factors such as the desired cost and complexity of the system, the highest expected pressure variation frequency, the specific processing components used in the signal processor 106, etc. The signal processor 106 filters the sampled pressure signal via an optimum digital filter. The signal processor then calculates the derivative, with respect to time, of the sampled pressure signal.

The inlet damper 108 is disposed at the inlet port 110, so that the gas flow 112 from the reservoir 114 into the chamber 102 must pass through the inlet damper 108. In the embodiment shown in FIG. 3, the inlet damper 108 is disposed directly inside the inlet port 110. In other embodiments, the inlet damper 108 may be situated just inside, just outside, or only partially in the inlet port 110, as long as the gas flow 112 passes, at least partially, through the damper 108. The inlet damper is constructed and arranged to modify one or more characteristics of the gas flow 112 as a function of the pressure drop across the damper 108, according to a damper transfer function H. In one embodiment, the inlet damper 108 is selected such that the transfer function H is a constant, i.e., such that the gas flow $Q_i$ through the damper 108 is linearly related to the pressure drop across the damper, i.e., $$Q_i = C(P_i - P) \quad (3)$$

where P is the pressure at the chamber end of the damper 108, $P_i$ is the pressure at the reservoir end of the damper 108, and C is the conductance of the damper. In other embodiments, the transfer function H may be a non-linear function, such as would be the case in a non-chocked flow across an orifice.

In the embodiment having a damper as described by equation (3), a change in chamber pressure P with respect to time may be given by substituting equation (3) into equation (1) as follows:

$$\frac{dP(t)}{dt} = \dot{P}(t) = \frac{P_{STP}}{V} C(P_i - P) \quad (4)$$

Figure 4:
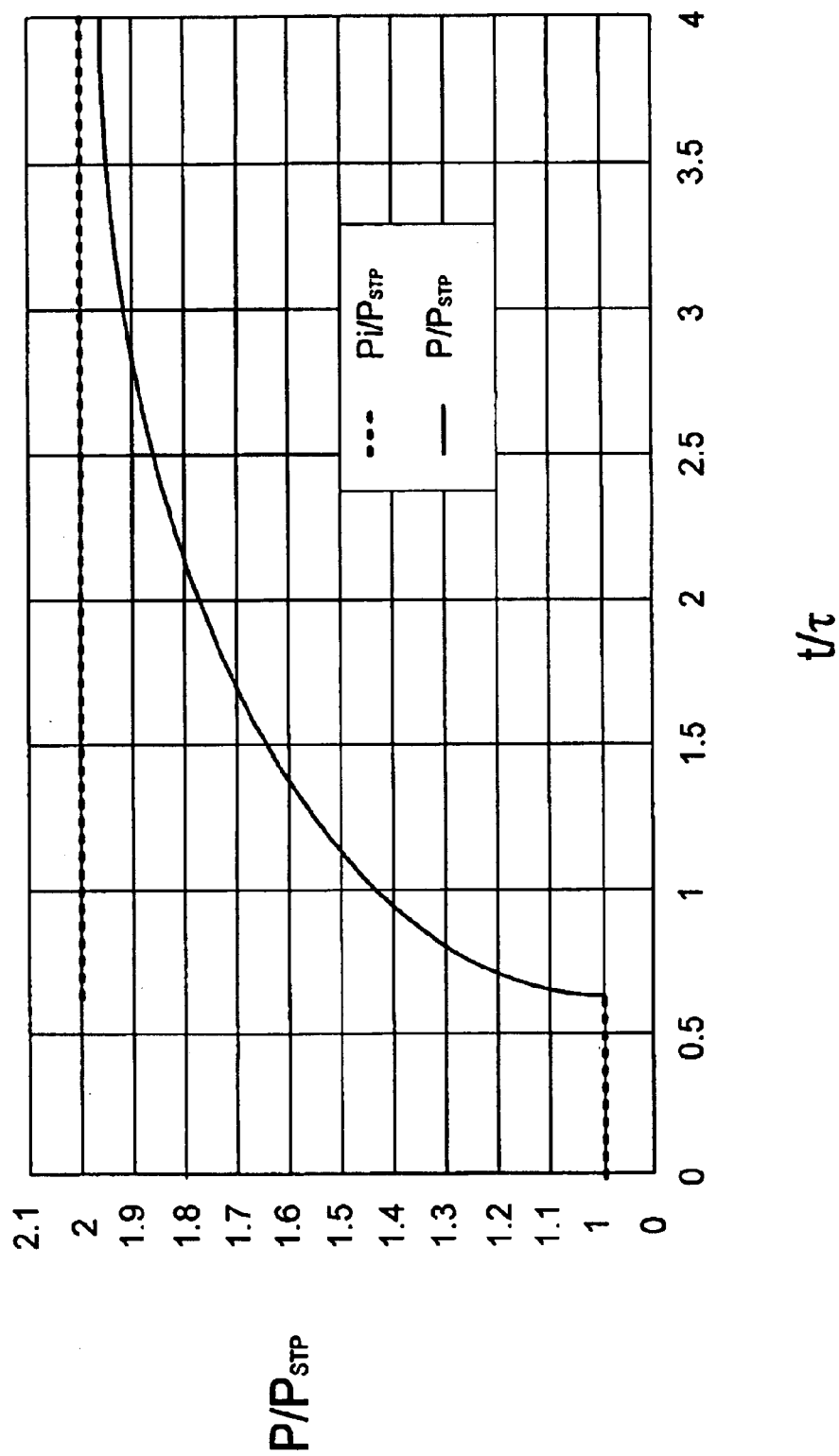
FIG. 4 illustrates how a damper as shown in FIG. 3 damps a rapid pressure change; and, FIG. 5 shows an embodiment of the apparatus shown in FIG. 3 with a flow sensor at the input and an outlet port.

For a step change in the inlet pressure $P_i$, equation (4) has a solution:

$$P(t) = P_f[1 - e^{-(t/\tau)}] + P_o e^{-(t/\tau)} \quad (5)$$

where $P_o$ is the initial pressure, $P_f$ is the final pressure, and $\tau = V/(CP_{STP})$ is the natural time constant associated with the system 100. FIG. 4 shows a graph of pressure versus time, for both a step change in the inlet pressure $P_i$, and the pressure P within the chamber 102. FIG. 4 illustrates how a damper that behaves according to equation (3) damps a rapid pressure change. The time constant $\tau$, and thus the damped response of the chamber pressure P, is a function of (i) the chamber volume V and (ii) the damper conductance C. The two parameters V and C can be adjusted so as to substantially reduce or eliminate frequency components in the chamber pressure variations that are higher than the digital differentiator cutoff frequency.

The pressure variations dP/dt can be expressed as a Fourier series, i.e., $$\frac{dP(t)}{dt} = \dot{P}(t) = \sum_{0}^{N} A_n e^{j\omega_n t} \quad (6)$$

The Fourier coefficients $A_n$ may be derived from equation (5) as $$A_n \approx \frac{1}{1 + (\omega_n \tau)^2} \quad (7)$$

For a given constraint on the Fourier coefficients $A_n$, equation (7) can be used to solve for $\tau$. Consider an exemplary case in which the sampling frequency is 1 kHz, and an optimal digital differentiation scheme as described herein is used to process the sampled pressure signal from the pressure sensor. To accommodate the performance roll-off of the optimal differentiator, it is desired that all frequency components of the pressure variations above 30 percent of the sampling frequency be below 0.1 percent. Alternatively stated, all amplitudes $A_n$ above the frequency of 300 Hz are preferably held below $1 \times 10^{-3}$. Using a maximum $\omega$ of 1885 rad/sec, together with $A_n = \times 10^{-3}$ results in $\tau \approx 20$ msec. Thus, manipulating either the conductance C of the damper, the volume V of the measurement chamber, or both, so that $\tau \approx 20$ msec will result in limiting the frequency components of the pressure variations in the chamber that are greater than 300 Hz to less than $1 \times 10^{-3}$.

Figure 5:
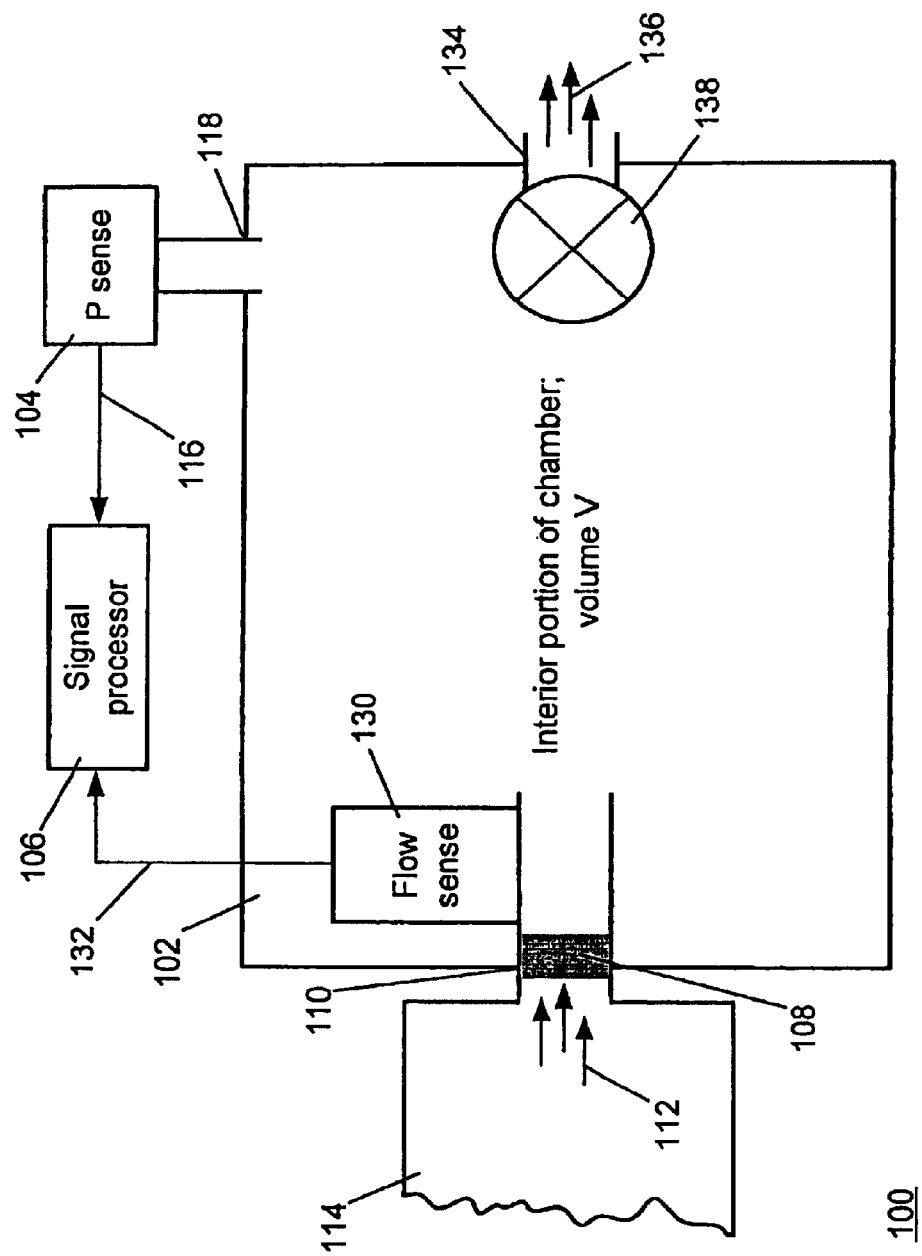

In the embodiment shown in FIG. 5, the apparatus 100 further includes a flow sensor 130 at the input of the measurement chamber 102. The flow sensor 130 measures the rate of the gas flow into the chamber 102, and provides a flow signal 132 corresponding to the flow rate to the signal processor 106. This embodiment also includes an outlet port 134 that allows an outlet gas flow 136 from the chamber 102, and a valve 138 at the outlet port 134 for controlling the outlet gas flow 136. The signal processor 106 combines the flow signal 132 from the flow sensor 130 with the time derivative the signal processor 106 derives from the pressure signal 116, and calculates an estimate of the outlet gas flow 136 from the combination. The signal processor 106 calculates the estimate by using equation (1), and substituting $[Q_{in}(t) - Q_{out}(t)]$ for the variable Q(t). The signal processor 106 uses the output of the flow sensor 130 for $Q_{in}(t)$, and solves for $Q_{out}(t)$. Additional details relating to this embodiment may be found in co-pending U.S. patent application Ser. No. 10/178,721, entitled "Apparatus And Method For Pressure Fluctuation Insensitive Mass Flow Control." In the embodiment shown in FIG. 5, the damper 108 is situated prior to the flow sensor 130, i.e., the inlet gas flow 112 from the reservoir 114 passes through the damper 108 before it reaches the flow sensor 130. In other embodiments, the damper 108 may be situated after the flow sensor 130, so that only the pressure sensor 104, and not the flow sensor 130, experience the resulting damping effects.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An apparatus for conditioning a gas flow to improve a measurement of rate of pressure change associated with the gas flow, comprising:

a measurement chamber having an interior portion characterized by an internal volume, and an inlet port for receiving the gas flow;

a pressure sensor for sensing a pressure within the interior portion of measurement chamber and for producing a pressure signal corresponding the pressure within the measurement chamber;

a signal processor for receiving, sampling the pressure signal at a sampling frequency and filtering the pressure signal so as to produce a sampled pressure signal, and for calculating a time derivative of the sampled pressure signal; and, an inlet damper disposed at the inlet port, constructed and arranged such that the gas flow passes, at least partially, through the inlet damper prior to passing through the inlet port and into the measurement chamber, wherein the inlet damper modifies one or more characteristics of the gas flow as a function of a pressure drop across the inlet damper, according to a damper transfer function;

wherein the internal volume and the damper transfer function are selected so as to limit a frequency associated with variations of the pressure within the measurement chamber to a predetermined fraction of the sampling frequency.

2. An apparatus according to claim 1, wherein the pressure sensor is disposed within the interior portion of the measurement chamber.

3. An apparatus according to claim 1, wherein the pressure sensor is disposed at the inlet port, and produces a pressure signal corresponding to an inlet flow pressure.

4. An apparatus according to claim 1, wherein the damper transfer function describes a linear relationship between (i) the pressure drop across the inlet damper and (ii) the gas flow through the inlet damper.

5. An apparatus according to claim 1, wherein the damper transfer function describes a non-linear relationship between (i) the pressure drop across the inlet damper and (ii) the gas flow through the inlet damper.

6. An apparatus according to claim 1, wherein the predetermined fraction of the sampling frequency corresponds to a performance limit associated with the signal processor for calculating a time derivative of the sampled pressure signal.

7. An apparatus according to claim 1, wherein the predetermined fraction of the sampling frequency is about 0.4.

8. An apparatus according to claim 1, further including:

a flow sensor for measuring the gas flow through the inlet port and for producing a flow signal corresponding to the gas flow through the inlet port;

an outlet port on the measurement chamber for passing an outlet gas flow; and, a valve disposed at the outlet port for controlling the outlet gas flow;

wherein the signal processor (i) combines the flow signal with the time derivative of the sampled pressure signal so as to produce an estimate of the outlet gas flow, and (ii) controls the valve as a function of the estimate, so as to produce a substantially constant outlet gas flow.

9. An apparatus according to claim 8, wherein the damper is disposed before the flow sensor.

10. An apparatus according to claim 8, wherein the damper is disposed after the flow sensor, and before the pressure sensor.

11. A method of conditioning a gas flow to improve a measurement of rate of pressure change associated with the gas flow, comprising:

providing a measurement chamber having an interior portion characterized by an internal volume, and an inlet port for receiving the gas flow;

sensing a pressure within the interior portion of measurement chamber and producing a pressure signal corresponding the pressure within the measurement chamber;

sampling the pressure signal at a sampling frequency and filtering the pressure signal so as to produce a sampled pressure signal, and calculating a time derivative of the sampled pressure signal;

damping the gas flow through the inlet port via an inlet damper disposed at the inlet port, so as to modify one or more characteristics of the gas flow as a function of a pressure drop across the inlet damper, according to a damper transfer function; and, selecting the internal volume and the damper transfer function so as to limit a frequency associated with variations of the pressure within the measurement chamber to a predetermined fraction of the sampling frequency.

12. A method according to claim 11, further including disposing the pressure sensor within the interior portion of the measurement chamber.

13. A method according to claim 11, further including disposing the pressure sensor at the inlet port, such that the pressure sensor produces a pressure signal corresponding to an inlet flow pressure.

14. A method according to claim 11, further including providing a damper transfer function that describes a linear relationship between (i) the pressure drop across the inlet damper and (ii) the gas flow through the inlet damper.

15. A method according to claim 11, further including providing a damper transfer function that describes a non-linear relationship between (i) the pressure drop across the inlet damper and (ii) the gas flow through the inlet damper.

16. A method according to claim 11, further including selecting the internal volume and the damper transfer function so as to limit a frequency associated with variations of the pressure within the measurement chamber to a predetermined fraction of the sampling frequency corresponding to a performance limit associated with the signal processor for calculating a time derivative of the sampled pressure signal.

17. A method according to claim 11, further including selecting the internal volume and the damper transfer function so as to limit a frequency associated with variations of the pressure within the measurement chamber to a predetermined fraction of the sampling frequency of about 0.4 of the sampling frequency.

18. A method according to claim 11, further including:

measuring the gas flow through the inlet port and for producing a flow signal corresponding to the gas flow through the inlet port;

providing an outlet port on the measurement chamber for passing an outlet gas flow; and, combining the flow signal with the time derivative of the sampled pressure signal so as to produce an estimate of the outlet gas flow; and, controlling the outlet gas flow at the outlet port as a function of the estimate, so as to produce a substantially constant outlet gas flow.

19. A method according to claim 18, further including disposing the damper before the flow sensor.

20. A method according to claim 18, further including disposing the damper after the flow sensor, and before the pressure sensor.

* * * * *